United States Patent [19]
Cazzaniga

[11] Patent Number: 6,119,724
[45] Date of Patent: Sep. 19, 2000

[54] TWO-WAY VALVE FOR REGULATING AND MEASURING THE FLOW RATE OF A FLUID

[75] Inventor: Luigi Cazzaniga, Biassono, Italy

[73] Assignee: Cazzaniga S.p.A., Milan, Italy

[21] Appl. No.: 09/265,005

[22] Filed: Mar. 9, 1999

[30] Foreign Application Priority Data

Mar. 25, 1998 [IT] Italy .................................. MI98A0622

[51] Int. Cl.[7] ................................................ F16K 37/00
[52] U.S. Cl. .................... 137/552; 137/625.3; 73/861.74
[58] Field of Search ................. 137/552, 625.3; 73/861.58, 861.61, 861.62, 861.71, 861.74

[56] References Cited

U.S. PATENT DOCUMENTS

| | | | |
|---|---|---|---|
| 351,275 | 10/1886 | Metcalf | 137/625.3 X |
| 2,013,822 | 9/1935 | Bradbury | 137/625.3 X |
| 2,574,866 | 11/1951 | Fahrlander | 73/861.58 |
| 3,099,999 | 8/1963 | Vismara | 137/625.3 X |
| 3,125,122 | 3/1964 | Bermingham | 137/625.3 X |
| 3,187,775 | 6/1965 | Pinnell | 137/625.3 X |
| 3,817,101 | 6/1974 | Takanoyama et al. | 73/861.71 |
| 3,881,354 | 5/1975 | Block | 73/861.71 |
| 4,366,718 | 1/1983 | Nelson | 73/861.71 X |
| 4,397,195 | 8/1983 | Hayward | 73/861.74 |
| 5,458,007 | 10/1995 | Lake | 73/861.58 |
| 5,890,515 | 4/1999 | Spiess et al. | 73/861.74 X |

*Primary Examiner*—John Rivell
*Attorney, Agent, or Firm*—Herbert Dubno

[57] ABSTRACT

A Two-way valve for regulating and measuring the flow rate of a fluid through a header (1) and a branched duct (2,2a) inside the header itself. The valve (10a, 10, 11, 11c) which shuts off the aperture (2b) of the branched duct (2) is internally hollow and movable axially by an associated actuator (13). Discs (30, 130) for detecting the pressure exerted by the flow of the fluid are integral with elements (20, 40) movable axially against the opposing action of a spring (60, 160) and form part of an instrument (70, 170) for measuring the flow rate. The valve comprises a head (10a), on the side surface of which recesses (10d) are formed.

18 Claims, 3 Drawing Sheets

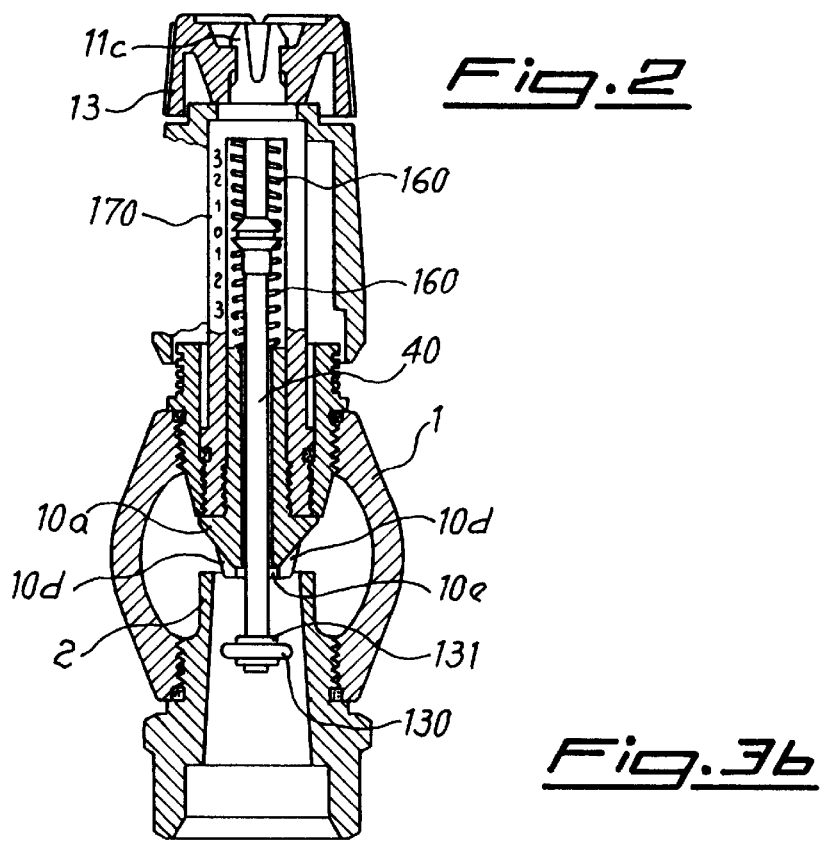
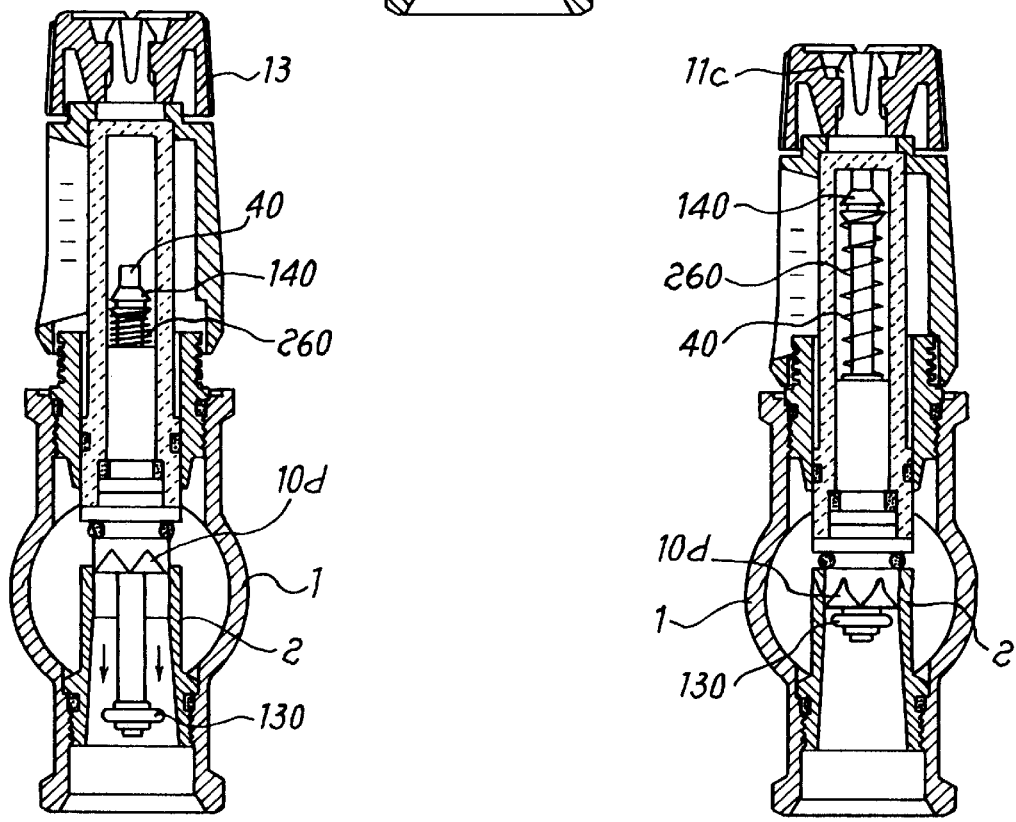

TWO-WAY VALVE FOR REGULATING AND MEASURING THE FLOW RATE OF A FLUID

SPECIFICATION

1. Field of the Invention

The present invention relates to a two-way valve for regulating and measuring the flow rate of a fluid through a header and a branched duct inside the header.

2. Background of the Invention

It is known that, in the technical sector relating to the construction of fluid supply networks, there is the need for multiple-channel headers for the delivery/return flow of the fluid to/from end users, as for example in the case of water supply piping for heating systems, in particular of the underfloor panel type.

It is also known that each of the branched piping sections which extend from the header must be provided with a valve for regulating the flow rate so as to be able to compensate for the different losses in head which occur in the various panels on account of the specific dimensions and their distance from the supply header.

It is also known that there are valves which can be fitted to said piping and which are able to perform regulation of the flow rate while at the same time effecting a measurement of the latter, said measurement being shown on a calibrated scale present on the valve body.

Examples of these valves are known, for example, from DE 35 09 718 which describes a valve which, although performing correctly its dual function (regulation/measurement), nevertheless has a drawback in that it is set for operation with a direction of the flow opposite to the direction of displacement of the stem for closing the valve itself.

This means that the valve is not suitable for the opposite type of operation, i.e. those applications where the header receives the return fluid from the various branched sections instead of emitting the delivery fluid.

In an attempt to overcome this drawback, CH-103,093 describes a valve which is able to operate in both directions, provided that the valve itself is disassembled at the time of its installation in order to eliminate at least one component part and modify the relative position of other parts thereof.

This need for disassembly means that the valve is not very popular among installation engineers since they have to modify the internal structure thereof at the time of fitting, with the consequent risk of error and malfunction in addition to an increase in the associated labor costs. Moreover, the different production requirements which arise initially would result in the need for double storage together with management thereof and an increase in the costs per single unit.

OBJECTS OF THE INVENTION

It is an object of the invention to provide a valve for shutting off and regulating the flow rate in fluid supply piping, which incorporates an instrument for measuring and displaying the value of the flow rate and which is able to operate in both directions without the need for prior modification of the valve structure.

A further object is to provide such a valve which consists of a small number of parts which can be manufactured and assembled easily and at a low cost and which ensure precise and reliable measurement.

SUMMARY OF THE INVENTION

These technical problems are solved according to present invention by a two-way valve for regulating and measuring the flow rate of a fluid through a header and a branched duct inside the header itself, which comprises means for shutting off the aperture of the branched duct, which are internally hollow and movable axially by means of associated actuating means, means for detecting the pressure exerted by the flow of the fluid, which are integral with elements movable axially against the opposing action of resilient means and forming part of an instrument for measuring the flow rate, wherein the means for shutting off the aperture of the branched duct comprises a head, on the side surface of which recesses are formed.

BRIEF DESCRIPTION OF THE DRAWING

The above and other objects, features, and advantages will become more readily apparent from the following description, reference being made to the accompanying drawing in which:

FIG. 2 is a view, partially section along a vertical plane, of a second embodiment of the valve according to the invention;

FIGS. 3a, 3b are views, partially section along a vertical plane, of a third embodiment of the valve according to the invention in the case of a direction of flow which is the same as the direction of closing of the valve and in the open condition and closed condition, respectively;

As illustrated in FIG. 1, a header 1 comprises at least one supply duct 2 extending inside it in a direction substantially transverse to the direction of flow of the fluid; in the example according to the Figure, the supply duct is integrally joined to the header by means of a connection consisting of a screw 2a/female thread 1a with the arrangement, in between, of a sealing ring 3.

Figure 1:
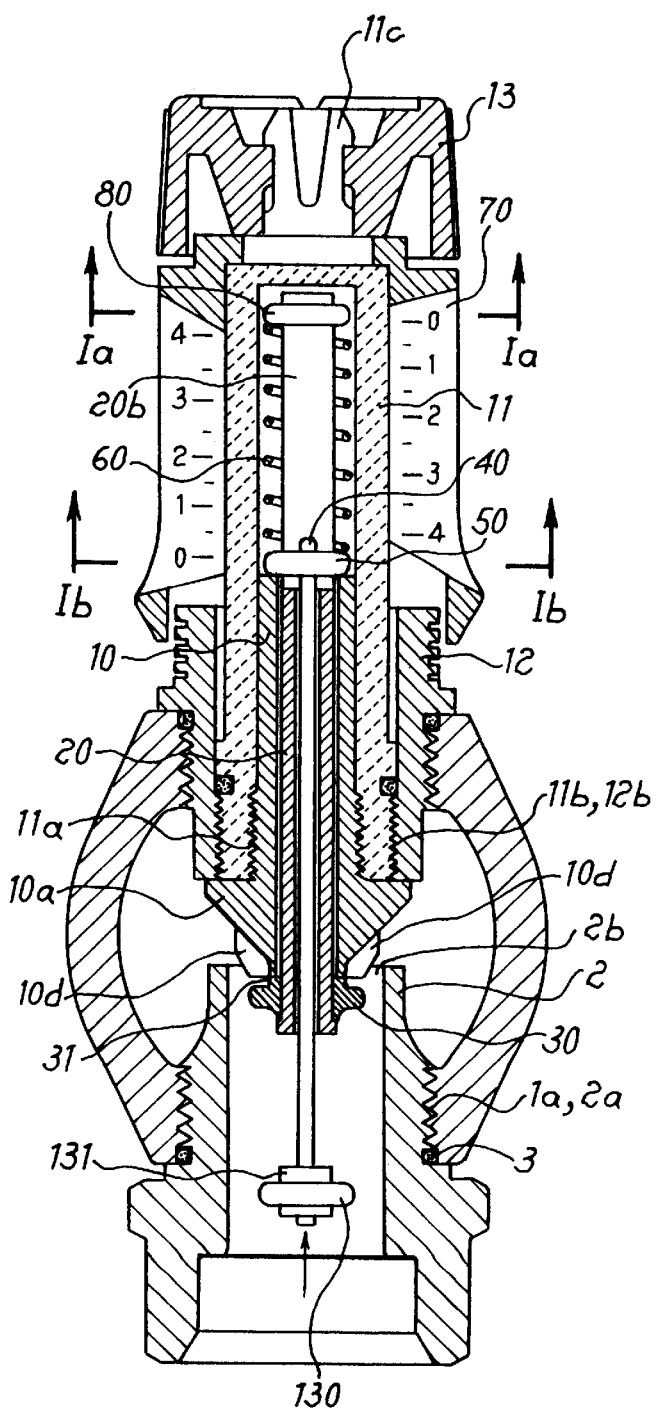
FIG. 1 is a view, partially section along a vertical plane, of a first embodiment of the valve according to the invention.
Figure 1A:
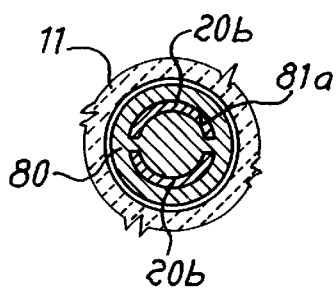
FIG. 1a is a partial section along the plane Ia—Ia of FIG. 1.
Figure 1B:
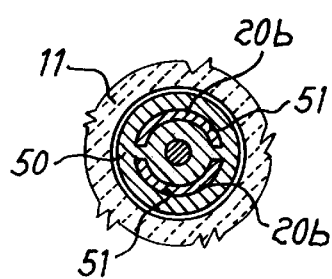
FIG. 1b is a partial section along the plane Ib—Ib of FIG. 1.
Figure 1C:
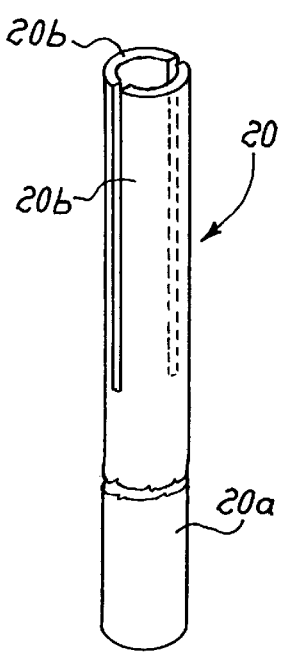
FIG. 1c is a perspective view of the hollow rod supporting the device for indicating the flow in the same direction as the direction of closing of the valve.

The free edge 2b of the supply duct 2 inside the header 1 forms the through-aperture of the valve.

Opening of the aperture 2b may be regulated by means of a head 10a forming the end of a stem 10 which is internally hollow and screwed onto the internal female thread 11a of a transparent tube 11 which is in turn screwed by means of a threading 11b onto the female thread 12b of a connection-piece 12 screwed onto the header 1.

The end of the transparent tube 11 opposite to that inside the header 1 has an extension 11c with a square cross-section, suitable for engagement with an operating knob 13, rotation of which in either direction causes rotation of the transparent tube 11 on the female thread 12b of the connection-piece 12 and therefore the downward/upward movement of the head 10a, which is associated with it by means of the stem 10, towards/away from the aperture 2b of the duct 2 with a corresponding decrease/increase in the opening and the fluid flow rate.

The head 10 has a substantially frustoconical shape, on the side surface of which recesses 10d in the form of a dihedron formed by faces with a substantially triangular cross-section having the base at the free end of the head 10a are present; the head 10 therefore forms the obturator of the flow regulation valve. This shape of the head 10a results in a substantial increase in the incision cross-section in the axial direction of closing of the valve which ensures a more uniform flow of the fluid both entering into the duct 2 from the header 1 and leaving the duct 2 towards the header 1.

This results in more stable and uniform measurement of the flow rate as described below.

In addition to this, the configuration of the head 10a results in a substantially linear progression of the flow rate control characteristic, which allows a very fine adjustment of the flow rate itself, making it possible to achieve a degree of measuring precision which cannot be achieved with the known devices.

In a preferred embodiment of the head 10a, the latter has a free end with an annular seat 10e extending inwards, the purpose of which will be clarified below.

In order to be able to measure the variation in flow rate of the fluid which flows into the branched duct of the header 1, said stem 10 has, inserted coaxially inside it, a sleeve 20, the end part of which corresponding to the head 10a is integral, while the remaining part is divided, by means of a cut, into two longitudinal and symmetrical tongues 20b which extend inside the transparent tube 11 substantially as far as the opposite end thereof.

The end of the sleeve 20 inside the supply duct 2 has, mounted on it, a disk 30 formed as one piece with a hub 31 by means of which it may be force-fitted onto the said integral end of the sleeve 20.

As will emerge more clearly below, said disk forms the element for resisting the flow of the fluid in order to measure the flow rate in the case of a flow in the same direction as the direction of closing of the valve.

At the end inside the transparent tube 11, the sleeve 20 has, mounted on it, a ring 80 provided with two internal seats shaped so as to have a cross-section corresponding to that of the tongues 20b onto which it may thus be inserted and force-fitted.

Said ring 80 forms the device indicating the flow rate measurement in the event of a flow in a direction opposite to the direction of closing of the valve.

The transparent sleeve 20 has, axially and slidably inserted inside it, a rod 40, the opposite ends of which, respectively the end inside the header 1 and the end inside the transparent tube 11, have integrally joined to them (for example by means of keying) a disk 130 with a hub 131 similar to that already described, and a ring 50 in turn internally shaped so as to have two seats 51 with a form corresponding to the cross-section of the tongues 20b, but with a slightly greater area in order to allow relative sliding.

Said ring 50, in addition to forming the device indicating the measurement of the flow rate in the case of a flow in the same direction as the direction of closing of the valve, also has the function of stopping the travel in the sense of closing of the valve stop, which occurs when the ring comes into contact with the top surface of the stem 10.

A suitably calibrated spring 60 is located in between the two rings 50 and 80 which are respectively integral with the sleeve 20 and the rod 40.

Figure 5:
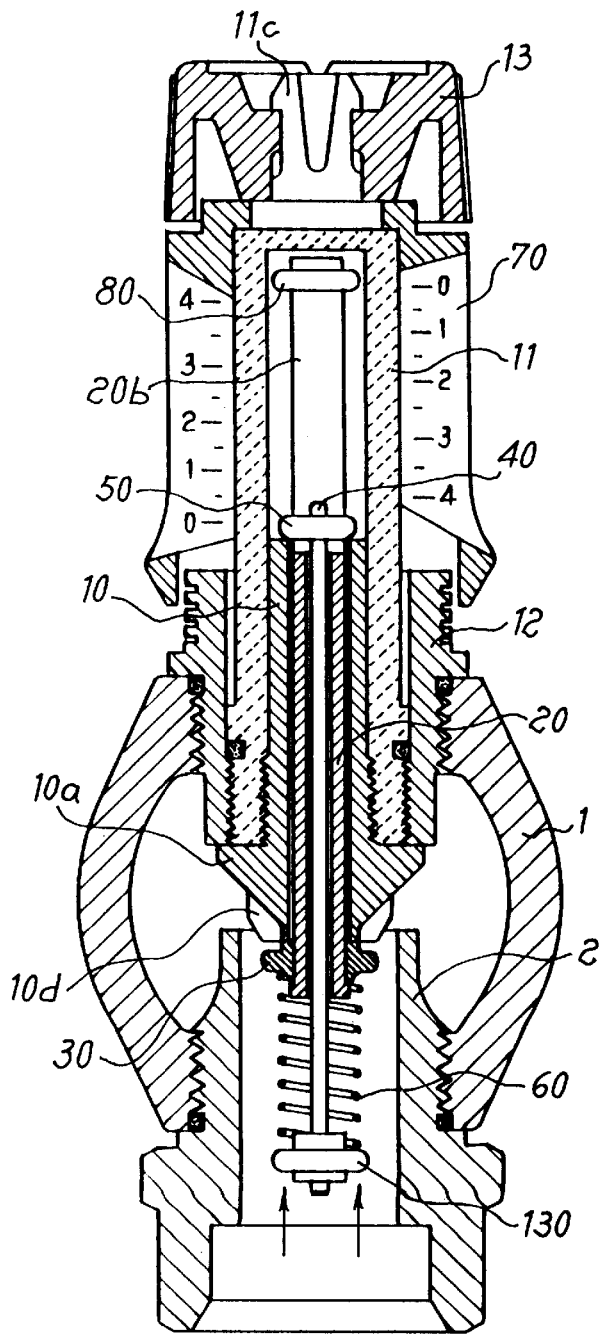
FIG. 5 is a variation of an example of embodiment of the valve according to FIG. 1.

As shown in FIG. 5, said spring could alternatively be arranged between the two disks 30 and 130 which are respectively integral with the sleeve 20 and the rod 40.

Finally, a shaped body 70 is arranged concentrically with the transparent tube 11, said body having two graduated scales with an opposite progression in the axial direction for reading the flow rate in the event of flow in the same direction as the direction of closing of the valve or in the case of a flow in the opposite direction, respectively.

As can be easily understood from the FIG., in the case of a flow in a direction different from the direction of closing of the valve (namely when the fluid passes from the duct 2 to the header 1), the disk 30 integral with the sleeve 20 is kept pushed against the head 10a by the action of the spring 60 and consequently the ring 80 is positioned opposite the zero of the respective scale as is also the ring 50 (in the rest condition) kept positioned opposite the zero of the associated graduated scale by the thrust of the spring 60.

With a variation in opening of the valve as a result of operation of the operating knob 13, the fluid will exert a pressure on the disk 130 integral with the rod 40, causing an upward movement again of the latter inside the sleeve 20 and a consequent axial displacement of the ring 50 which will assume a position opposite a value on the graduated scale corresponding to the flow rate set.

In the case of a flow in the same direction as the direction of closing of the valve, the fluid, entering into the branched duct 2, will act on the disk 30 integral with the sleeve 20, causing a translatory movement of the latter against the opposing action of the spring 60. Said translatory movement will cause the ring 80 to move by a corresponding amount along the associated graduated scale, showing the measurement of the flow rate.

When the valve is closed (not shown), the top part of the hub 31 of the disk 30 integral with the sleeve 20 engages into the seat 10e of the head 10a, causing closing of the internal duct and ensuring sealing of the valve also in the case of breakage of the body of the measuring instrument, a breakage which would result in seepage of fluid if this seal were not provided.

As shown in FIG. 2, the two-way valve may be realised without the transparent sleeve 20, but by arranging two springs 160 on opposite sides of the ring 140 integral with the rod 40.

In this case the device will be balanced in a position which will be adopted as the central zero point of the measuring instrument so as to result in a positive reading both in the case of a flow in the same direction and in the case of a flow in a direction opposite to the direction of closing of the valve.

Correspondingly, the rod 40 will have a larger axial dimension so as to bring back (in the rest condition) the disk 130 into a position further inside the duct 2 so as to allow axial translation thereof in both directions according to the direction of flow of the fluid.

Figure 4:
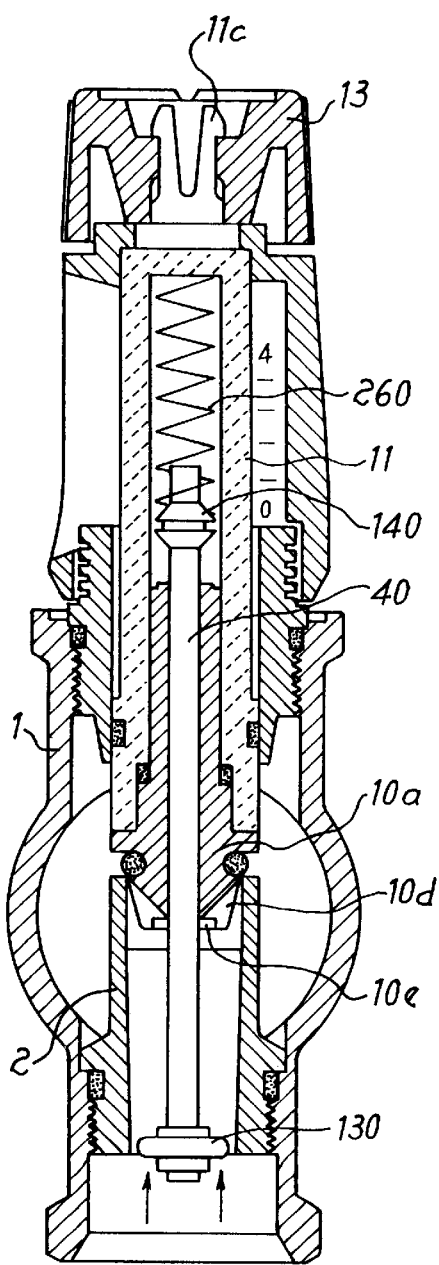
FIG. 4 is a view, partially section along the vertical plane, of the valve according to FIG. 3a, in the case of a flow in the opposite direction to the direction of closing of the valve.

As illustrated in FIGS. 3a, 3b and 4, a further simplified form of the valve according to the invention is also envisaged.

In this configuration a single opposition spring 160 is coaxially mounted on the rod 40 and, in order to obtain a valid measurement for the two directions of flow of the fluid, it will be necessary to displace the spring on either side of the ring 140 so as to obtain the reaction to the thrust imparted by the fluid.

In all the configurations described, with the valve according to the invention it is possible to obtain also an indication of the direction of flow of the fluid in addition to regulation of the flow rate and an indication as to the measurement of the latter.

What is claimed is:

1. A two-way valve for regulating and measuring a flow rate of a fluid through a header and a branched duct inside the header, which comprises:

means for shutting off an aperture of the branched duct, which are internally hollow and movable axially by means of an associated actuator and:

means for detecting a pressure exerted by the flow of the fluid and integral with elements movable axially against the opposing action of resilient means and forming part of an instrument for measuring the flow rate, said means for shutting off the aperture of the branched duct comprising a head on a side surface of which recesses are formed.

2. The valve according to claim 1 wherein said recesses are in the form of dihedrons having faces with a substantially triangular cross-section with a base at the free end of the head.

3. The valve according to claim 1 wherein said head has an annular coaxial seat formed on a free front surface thereof.

4. The valve according to claim 1 wherein said means for detecting includes a resistance element in the form of a symmetrical disk.

5. The valve according to claim 4 wherein said disk is integral with a hub for connection to an element supporting the disk.

6. The valve according to claim 5 wherein said hub has an annular extension in the axial direction suitable for insertion in said seat of the head.

7. The valve according to claim 1 wherein means is provided for supporting the head in a coaxially slidable manner including a sleeve having mounted at its opposite ends, inside and outside the header respectively, a first disk resisting the flow of the fluid and a first ring forming an indicator device of the measuring instrument.

8. The valve according to claim 7 wherein said sleeve has an end part in the region of the head which is integral and a remaining part divided into at least two longitudinal and symmetrical tongues.

9. The valve according to claim 7 wherein said sleeve comprises internally, in a slidable manner, a rod having mounted at its opposite ends, inside and outside the header respectively, a second disk resisting the flow of the fluid and a second ring forming an indicator device of the measuring instrument.

10. The valve according to claim 7 wherein an opposition spring is located between the second ring and the first ring integral with the sleeve and the rod, respectively.

11. The valve according to claim 7 wherein an opposition spring is located between the first resistance disk and the second resistance disk.

12. The valve according to claim 1 wherein said measuring instrument has two separate graduated scales with an opposite progression associated with a first indicator and a second indicator, respectively.

13. The valve according to claim 1 wherein means are provided for supporting the head and comprise internally, in a coaxially slidable manner, a rod which has integrally joined to an end inside the header a disk for resisting the flow of the fluid, said rod having, associated with it, a ring arranged on the rod inside the measuring instrument.

14. The valve according to claim 13 which comprises a pair of springs coaxially arranged on the rod inside the measuring instrument and on opposite sides of the said ring integral with the rod itself.

15. The valve according to claim 13 wherein the scale of the instrument has a central zero point.

16. The valve according to claim 13 which has a single spring coaxial with the rod.

17. The valve according to claim 16 wherein said spring is located between the indicator ring and the outer end of the measuring instrument.

18. The valve according to claim 16 wherein said spring is arranged between the indicator ring and the end of the stem opposite to the head.

* * * * *